United States Patent
Giagnocavo et al.

(10) Patent No.: US 11,962,718 B2
(45) Date of Patent: Apr. 16, 2024

(54) AUTOMATED ROBOCALL DETECTION

(71) Applicant: CenturyLink Intellectual Property LLC, Broomfield, CO (US)

(72) Inventors: Patrick Giagnocavo, Littleton, CO (US); Michael Stillman, Colorado Springs, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 17/736,645

(22) Filed: May 4, 2022

(65) Prior Publication Data

US 2023/0216955 A1     Jul. 6, 2023

Related U.S. Application Data

(60) Provisional application No. 63/296,355, filed on Jan. 4, 2022.

(51) Int. Cl.
*H04M 3/436*     (2006.01)
*H04M 3/42*      (2006.01)

(52) U.S. Cl.
CPC ....... *H04M 3/436* (2013.01); *H04M 3/42085* (2013.01); *H04M 2203/2027* (2013.01)

(58) Field of Classification Search
None
See application file for complete search history.

(56) References Cited

U.S. PATENT DOCUMENTS

| | | | |
|---|---|---|---|
| 10,110,738 B1* | 10/2018 | Sawant | G06N 3/044 |
| 11,343,374 B1* | 5/2022 | Rolia | H04M 3/36 |
| 2005/0180547 A1* | 8/2005 | Pascovici | G10L 17/12 |
| | | | 379/88.19 |
| 2007/0076853 A1* | 4/2007 | Kurapati | H04M 3/436 |
| | | | 379/1.01 |
| 2013/0216029 A1* | 8/2013 | Pawlewski | H04M 3/2281 |
| | | | 379/88.01 |
| 2021/0092223 A1* | 3/2021 | Gallagher | H04M 3/2281 |
| 2022/0046126 A1* | 2/2022 | Grabowski | H04M 3/436 |
| 2022/0247866 A1* | 8/2022 | Xiao-Devins | H04M 3/436 |

* cited by examiner

*Primary Examiner* — Harry S Hong

(57) ABSTRACT

Novel tools and techniques are provided for implementing automated robocall detection. In various embodiments, a computing system may compare first abstracted raw data, obtained from a portion of call data from a first call from a first originating party, with each of a plurality of abstracted raw data, obtained from portions of call data from a plurality of calls from a corresponding plurality of originating parties. In some instances, the plurality of abstracted raw data and the first abstracted raw data may each include at least one of word count data, phoneme count data, inter-word timing data, voice pitch estimation data, and/or background noise data. The computing system may determine whether the first abstracted raw data is indicative of the first call being a suspected unsolicited or unwanted communication, based at least in part on the comparison. If so, the computing system may perform one or more tasks.

19 Claims, 8 Drawing Sheets

Optimization

Abstraction

Comparison

Determination

AUTOMATED ROBOCALL DETECTION

CROSS-REFERENCES TO RELATED APPLICATIONS

This application claims priority to U.S. Patent Application Ser. No. 63/296,355 (the "'355 application"), filed Jan. 4, 2022, by Patrick Giagnocavo et al., entitled, "Automated Robocall Detection," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing call service provisioning, and, more particularly, to methods, systems, and apparatuses for implementing automated robocall detection.

BACKGROUND

Conventional robocall detection typically compares originating party information of a call with corresponding information for suspected fraudulent callers. Such techniques, however, do not take into account analysis of the messages contained in such a call or analysis of data abstracted from such messages. As such, conventional techniques are susceptible to use of spoofing or multiple different originating party information that may be implemented by suspected fraudulent callers.

Hence, there is a need for more robust and scalable solutions for implementing call service provisioning, and, more particularly, to methods, systems, and apparatuses for implementing automated robocall detection.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
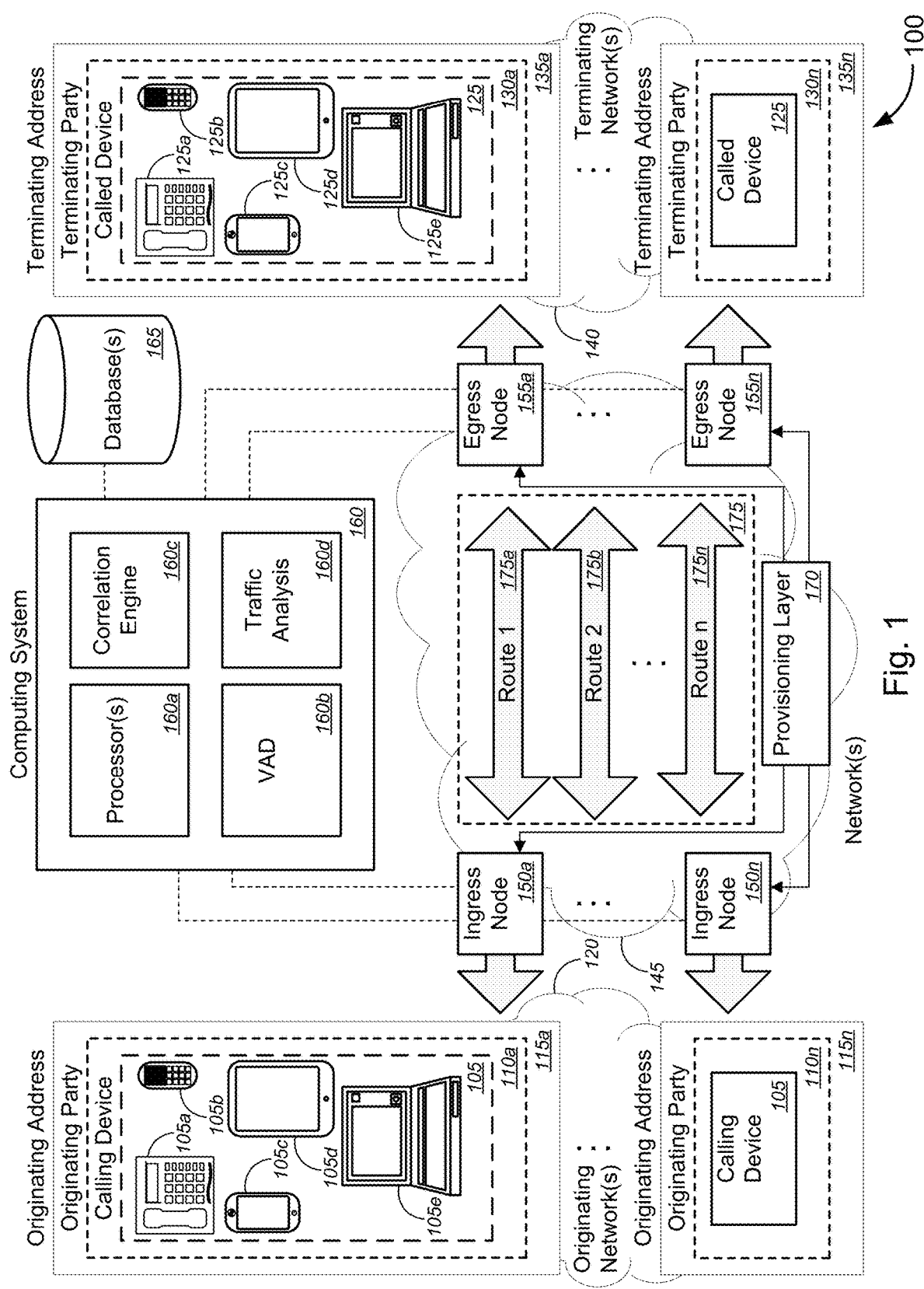
FIG. 1 is a schematic diagram illustrating a system for implementing automated robocall detection, in accordance with various embodiments.

Various embodiments provide tools and techniques for implementing call service provisioning, and, more particularly, to methods, systems, and apparatuses for implementing automated robocall detection.

In various embodiments, a computing system may compare first abstracted raw data, which may be obtained from a portion of call data associated with a first call from a first originating party to a first destination party, with each of a plurality of abstracted raw data, which may be obtained from portions of call data associated with a plurality of calls from a corresponding plurality of originating parties. In some instances, the plurality of abstracted raw data and the first abstracted raw data may each include, without limitation, at least one of word count data, phoneme count data, inter-word timing data, voice pitch estimation data, or background noise data, and/or the like. The computing system may determine whether the first abstracted raw data is indicative of the first call being a suspected unsolicited or unwanted communication, based at least in part on the comparison. Based on a determination that the first abstracted raw data is indicative of the first call being a suspected unsolicited or unwanted communication, the computing system may perform one or more tasks.

Merely by way of example, in some cases, the suspected unsolicited or unwanted communication may include, but is not limited to, at least one of a telemarketing communication, a robocall communication, or a communication instigating fraudulent activity, and/or the like. In some instances, the suspected unsolicited or unwanted communication may include, without limitation, a pre-recorded message.

In some embodiments, the portion of the call data of the first call may include, but is not limited to, at least one of: a first portion of the call data, the first portion of the call data being of a first predetermined duration; a second portion of the call data overlapping with the first portion, without an initial portion that is of a second predetermined duration; or a third portion of the call data after any of the first portion or the second portion, the third portion being of a third predetermined duration; and/or the like. In some instances, the first predetermined duration may be any suitable duration (e.g., 5, 6, 7, 8, 9, 10, 11, 12, 13, 14, or 15 seconds, or longer, or within any suitable range of time between 5 and 120 seconds, or longer, or the like), while the second predetermined duration may also be any suitable duration (e.g., 1, 2, 3, 4, or 5 seconds, or longer, or within any suitable range of time between 5 and 120 seconds, or longer, or the like), and the third predetermined duration may also be any suitable duration (e.g., 5, 6, 7, 8, 9, 10, 11, 12, 13, 14, or 15 seconds, or longer, or within any suitable range of time between 5 and 120 seconds, or longer, or the like).

According to some embodiments, the computing system may abstract raw data from the portion of the call data associated with the first call from the first originating party to produce the first abstracted raw data. In some cases, abstracting the raw data to produce the first abstracted raw data may comprise abstracting, using the computing system, raw data from the portion of the call data associated with the first call from the first originating party to produce the first abstracted raw data, without transcription of communication contained within the call data and without use of speech-to-text or text-to-speech functionality on the communication contained within the call data.

According to some embodiments, the one or more tasks may include, but are not limited to, at least one of: blocking the first call; responding to a call request that is associated with the first call with a busy signal; sending a message to the first destination party indicating that the first call is a suspected unsolicited or unwanted communication; updating a corpus of suspected robocalls to include the first abstracted raw data to the plurality of abstracted raw data; or training rapid fraud determination; and/or the like.

By comparing abstracted raw data of calls (e.g., word count, phoneme count, inter-word timing, voice pitch estimation, background noise, etc.) with corresponding abstracted raw data obtained from previously determined suspected unsolicited or unwanted communication (e.g., robocalls or calls with pre-recorded messages, etc.), the automated robocall detection system and technique may allow for more accurate and/or precise robocall detection by analyzing aspects of call messages that may be indicative of such suspected unsolicited or unwanted communication.

These and other aspects of the automated robocall detection are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, call routing technology, call routing management technology, data routing technology, data routing management technology, network management technology, robocall detection technology, fraudulent communication detection technology, and/or the like. In other aspects, certain embodiments, can improve the functioning of user equipment or systems themselves (e.g., call routing systems, call routing management systems, data routing systems, data routing management systems, network management systems, robocall detection systems, fraudulent communication detection systems, etc.), for example, by comparing, using a computing system, first abstracted raw data, which is obtained from a portion of call data associated with a first call from a first originating party to a first destination party, with each of a plurality of abstracted raw data, which are obtained from portions of call data associated with a plurality of calls from a corresponding plurality of originating parties, the plurality of abstracted raw data and the first abstracted raw data each comprising at least one of word count data, phoneme count data, inter-word timing data, voice pitch estimation data, or background noise data; determining, using the computing system, whether the first abstracted raw data is indicative of the first call being a suspected unsolicited or unwanted communication, based at least in part on the comparison; and based on a determination that the first abstracted raw data is indicative of the first call being a suspected unsolicited or unwanted communication, performing, using the computing system, one or more tasks; and/or the like.

In particular, to the extent any abstract concepts are present in the various embodiments, those concepts can be implemented as described herein by devices, software, systems, and methods that involve specific novel functionality (e.g., steps or operations), such as, correlating groups of abstracted raw data based on one or more characteristics (e.g., word count, phoneme count, inter-word timing, voice pitch estimation, background noise, etc.); optimizing the message of the first call by extracting a portion of the message; abstracting the portion of the message into one or more characteristics (e.g., word count, phoneme count, inter-word timing, voice pitch estimation, background noise, etc.); pruning the groups of abstracted raw data to reduce the number of plurality of abstracted raw data to reduce the number for comparison; comparing the abstracted raw data (and characteristics thereof) with corresponding ones from each of the pruned groups; and determining similarity (in some cases, based on generated similarity score) between the abstracted raw data and each of the pruned groups; and/or the like, to name a few examples, that extend beyond mere conventional computer processing operations. These functionalities can produce tangible results outside of the implementing computer system, including, merely by way of example, optimized robocall or fraudulent call detection based at least on analysis of characteristics (e.g., word count, phoneme count, inter-word timing, voice pitch estimation, background noise, etc.), and/or the like, at least some of which may be observed or measured by customers and/or service providers.

In an aspect, a method may comprise comparing, using a computing system, first abstracted raw data, which is obtained from a portion of call data associated with a first call from a first originating party to a first destination party, with each of a plurality of abstracted raw data, which are obtained from portions of call data associated with a plurality of calls from a corresponding plurality of originating parties, the plurality of abstracted raw data and the first abstracted raw data each comprising at least one of word count data, phoneme count data, inter-word timing data, voice pitch estimation data, or background noise data; determining, using the computing system, whether the first abstracted raw data is indicative of the first call being a suspected unsolicited or unwanted communication, based at least in part on the comparison; and based on a determination that the first abstracted raw data is indicative of the first call being a suspected unsolicited or unwanted communication, performing, using the computing system, one or more tasks.

In some embodiments, the computing system may comprise at least one of one or more central processing units ("CPUs"), one or more graphics processing units ("GPUs"), one or more data processing units ("DPUs"), one or more tensor processing units ("TPUs"), a systolic array, a field-programmable gate array ("FPGA"), a correlation engine, a voice activity detection ("VAD") system, an application-specific integrated circuit ("ASIC") system, a call server, a call detail record ("CDR") system, a call controller, a call manager, a media gateway controller, a video call server, an instant messaging server, a centralized server, or a distributed computing system, and/or the like.

According to some embodiments, the first call may comprise one of a session initiation protocol ("SIP")-based communication, a public switched telephone network ("PSTN") communication, or a plain old telephone service ("POTS") communication, and/or the like. In some instances, the SIP-based communication may comprise at least one of a voice over Internet Protocol ("VoIP") call, an IP-based video call, or an instant message over IP, and/or the like.

Merely by way of example, in some cases, the suspected unsolicited or unwanted communication may comprise at least one of a telemarketing communication, a robocall communication, or a communication instigating fraudulent activity, and/or the like. In some instances, the suspected unsolicited or unwanted communication may comprise a pre-recorded message.

In some embodiments, the portion of the call data of the first call may comprise at least one of: a first portion of the call data, the first portion of the call data being of a first predetermined duration; a second portion of the call data overlapping with the first portion, without an initial portion that is of a second predetermined duration; or a third portion of the call data after any of the first portion or the second portion, the third portion being of a third predetermined duration; and/or the like.

According to some embodiments, the method may further comprise abstracting, using the computing system, raw data from the portion of the call data associated with the first call from the first originating party to produce the first abstracted raw data. In some cases, abstracting the raw data to produce the first abstracted raw data may comprise abstracting, using the computing system, raw data from the portion of the call data associated with the first call from the first originating party to produce the first abstracted raw data, without transcription of communication contained within the call data and without use of speech-to-text or text-to-speech functionality on the communication contained within the call data.

In some embodiments, comparing the first abstracted raw data with each of the plurality of abstracted raw data may comprise determining, using the computing system, one or more similarities between the first abstracted raw data and each of the plurality of abstracted raw data, based at least in part on comparison of the at least one of word count data, phoneme count data, inter-word timing data, voice pitch estimation data, or background noise data associated with the first abstracted raw data with the at least one of word count data, phoneme count data, inter-word timing data, voice pitch estimation data, or background noise data associated with each of the plurality of abstracted raw data.

According to some embodiments, comparing the first abstracted raw data with each of the plurality of abstracted raw data may further comprise generating, using the computing system, a similarity score based on the determined one or more similarities between the first abstracted raw data and each of the plurality of abstracted raw data. In some cases, determining whether the first abstracted raw data is indicative of the first call being a suspected unsolicited or unwanted communication may comprise determining that the generated similarity score is greater than a predetermined matching threshold value.

In some embodiments, determining the one or more similarities between the first abstracted raw data and each of the plurality of abstracted raw data may comprise: generating, using the computing system, a first score based on the first abstracted raw data; comparing, using the computing system, the first score with each of the plurality of second scores each based on a corresponding one of the plurality of abstracted raw data; and generating, using the computing system, a similarity score for each of the plurality of second scores based on the comparison of the first score with each of the plurality of second scores.

In some instances, the method may further comprise, prior to comparing the first score with each of the plurality of second scores, pruning, using the computing system, the plurality of abstracted raw data to reduce a number of second scores among the plurality of second scores that require comparison, by filtering out abstracted raw data from the plurality of abstracted raw data based at least in part on a difference in one or more of the at least one of word count data, phoneme count data, inter-word timing data, voice pitch estimation data, or background noise data, and/or the like. In some cases, the method may further comprise grouping, using the computing system, the plurality of abstracted raw data into one or more groups characterized by similarities in each of the at least one of word count data, phoneme count data, inter-word timing data, voice pitch estimation data, or background noise data, and/or the like.

In some cases, pruning the plurality of abstracted raw data to reduce the number of second scores among the plurality of second scores that require comparison may comprise filtering out abstracted raw data from the plurality of abstracted raw data based at least in part on the one or more groups. In some instances, grouping the plurality of abstracted raw data into one or more groups may further comprise grouping the plurality of abstracted raw data into one or more groups based at least in part on at least one of one or more entities associated with previously determined sources of unsolicited or unwanted communications corresponding to abstracted raw data among the plurality of abstracted raw data, one or more groups of entities associated with previously determined sources of unsolicited or unwanted communications corresponding to abstracted raw data among the plurality of abstracted raw data, or one or more characteristics of unsolicited or unwanted communications corresponding to abstracted raw data among the plurality of abstracted raw data.

According to some embodiments, the one or more tasks may comprise at least one of: blocking the first call; responding to a call request that is associated with the first call with a busy signal; sending a message to the first destination party indicating that the first call is a suspected unsolicited or unwanted communication; updating a corpus of suspected robocalls to include the first abstracted raw data to the plurality of abstracted raw data; or training rapid fraud determination; and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: compare first abstracted raw data, which is obtained from a portion of call data associated with a first call from a first originating party to a first destination party, with each of a plurality of abstracted raw data, which are obtained from portions of call data associated with a plurality of calls from a corresponding plurality of originating parties, the plurality of abstracted raw data and the first abstracted raw data each comprising at least one of word count data, phoneme count data, inter-word timing data, voice pitch estimation data, or background noise data, and/or the like; determine whether the first abstracted raw data is indicative of the first call being a suspected unsolicited or unwanted communication, based at least in part on the comparison; and based on a determination that the first abstracted raw data is indicative of the first call being a suspected unsolicited or unwanted communication, perform one or more tasks.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: compare first abstracted raw data, which is obtained from a portion of call data associated with a first call from a first originating party to a first destination party, with each of a plurality of abstracted raw data, which are obtained from portions of call data associated with a plurality of calls from a corresponding plurality of originating parties, the plurality of abstracted raw data and the first abstracted raw data each comprising at least one of word count data, phoneme count data, inter-word timing data, voice pitch estimation data, or background noise data, and/or the like; determine whether the first abstracted raw data is indicative of the first call being a suspected unsolicited or unwanted communication, based at least in part on the comparison; and based on a determination that the first abstracted raw data is indicative of the first call being a suspected unsolicited or unwanted communication, perform one or more tasks.

In some embodiments, the computing system may comprise at least one of one or more central processing units ("CPUs"), one or more graphics processing units ("GPUs"), one or more data processing units ("DPUs"), one or more tensor processing units ("TPUs"), a systolic array, a field-programmable gate array ("FPGA"), a correlation engine, a voice activity detection ("VAD") system, an application-specific integrated circuit ("ASIC") system, a call server, a call detail record ("CDR") system, a call controller, a call manager, a media gateway controller, a video call server, an instant messaging server, a centralized server, or a distributed computing system, and/or the like.

According to some embodiments, the one or more tasks may comprise at least one of: blocking the first call; responding to a call request that is associated with the first call with a busy signal; sending a message to the first destination party indicating that the first call is a suspected unsolicited or unwanted communication; updating a corpus of suspected robocalls to include the first abstracted raw data to the plurality of abstracted raw data; or training rapid fraud determination; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing call service provisioning, and, more particularly, to methods, systems, and apparatuses for implementing automated robocall detection, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing automated robocall detection, in accordance with various embodiments.

In the non-limiting embodiment of FIG. 1, system 100 may comprise a calling device 105 that is associated with an originating party 110a among a plurality of originating parties 110a-110n (collectively, "originating parties 110" or "calling parties 110" or the like) at corresponding originating addresses 115a-115n (collectively, "source addresses 115" or the like) in an originating network(s) 120. In some instances, the calling device 105 (also referred to as a "user device 105" or the like) may include, but is not limited to, at least one of a telephone 105a, a mobile phone 105b, a smart phone 105c, a tablet computer 105d, or a laptop computer 105e, and/or the like. System 100 likewise may comprise a called device 125 that is associated with a terminating party 130a among a plurality of terminating parties 130a-130n (collectively, "terminating parties 130" or "called parties 130" or the like) at corresponding terminating addresses 135a-135n (collectively, "terminating addresses 135" or the like) in a terminating network(s) 140. In some instances, the called device 125 (also referred to as a "user device 125" or the like), similar to calling device 105, may include, but is not limited to, at least one of a telephone 125a, a mobile phone 125b, a smart phone 125c, a tablet computer 125d, or a laptop computer 125e, and/or the like.

System 100 may further comprise network(s) 145 that communicatively couple calling devices 105 in originating network(s) 120 with called devices 125 in terminating network(s) 140. System 100 may further comprise a plurality of ingress nodes 150a-150n (collectively, "ingress nodes 150" or the like) that receives network traffic into network(s) 145 from at least one of calling devices 105, originating addresses 115a-115n, and/or originating network(s) 120, while sending network traffic from network(s) 145 to at least one of calling devices 105, originating addresses 115a-115n, and/or originating network(s) 120. System 100 may further comprise a plurality of egress nodes 155a-155n (collectively, "egress nodes 155" or the like) that relays network traffic within network(s) 145 to at least one of called devices 125 and/or terminating addresses 135a-135n, while receiving network traffic from at least one of called devices 125 and/or terminating addresses 135a-135n. Ingress nodes 150 and egress nodes 155 may otherwise be similar, if not identical, to each other in terms of functionality, configurations, and/or form-factor, or the like. Herein, "ingress" and "egress" may respectively refer to entry into and exit out of the network(s) 145 of call requests associated with one or more calls.

In some instances, the one or more calls may each include, but is not limited to, one of a session initiation protocol ("SIP")-based communication, a public switched telephone network ("PSTN") communication, or a plain old telephone service ("POTS") communication, and/or the like. In some instances, the call requests may include SIP data indicating a request to initiate a SIP-based media communication session between a calling party (e.g., originating party 110a, or the like) at an originating address (e.g., originating address 115a, or the like) in an originating network (e.g., originating network(s) 120, or the like) and a called party (e.g., terminating party 130a, or the like) at a terminating address (e.g., terminating address 135a, or the like) in a terminating network (e.g., terminating network(s) 140, or the like). In some cases, SIP-based communication may include, without limitation, at least one of a voice over Internet Protocol ("VoIP") call, an IP-based video call, or an instant message over IP, and/or the like.

In some embodiments, networks 120, 140, and 145 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the networks 120, 140, and 145 may include an access network of the service provider (e.g., an Internet service provider ("ISP")). In another embodiment, the networks 120, 140, and 145 may include a core network of the service provider and/or the Internet. In some instances, at least one of the originating network(s) 120 or the terminating network(s) 140 is the same as the network(s) 145. Alternatively, at least one of the originating network(s) 120 or the terminating network(s) 140 is different from the network(s) 145.

According to some embodiments, system 100 may further comprise a computing system 160 and corresponding database(s) 165. In some instances, computing system 160 may include, without limitation, at least one of one or more central processing units ("CPUs"), one or more graphics processing units ("GPUs"), one or more data processing units ("DPUs"), one or more tensor processing units ("TPUs"), a systolic array, a field-programmable gate array ("FPGA"), a correlation engine, a voice activity detection ("VAD") system, an application-specific integrated circuit ("ASIC") system, a call server, a call detail record ("CDR") system, a call controller, a call manager, a media gateway controller, a video call server, an instant messaging server, a centralized server, or a distributed computing system, and/or the like. In some cases, computing system 160 may include, but is not limited to, at least one of one or more processors 160a (e.g., the one or more CPUs, the one or more GPUs, the one or more DPUs, and/or the one or more TPUs, or the like), VAD system 160b, correlation engine 160c, or traffic analysis system 160d, and/or the like. System 100 may further comprise provisioning layer 170 of network(s) 145 that may be configured to receive network routing instructions from computing system 160 and to send instructions to one or more ingress nodes 150 and/or one or more egress nodes 155 to control routing of network traffic data or SIP data/requests within network(s) 145 over one or more routes 175a-175n (collectively, "routes 175" or the like).

In operation, a computing system (e.g., computing system 160, or the like) may compare first abstracted raw data, which may be obtained from a portion of call data associated with a first call from a first originating party (e.g., originating party 110a, or the like) to a first destination party (e.g., terminating party 130a, or the like), with each of a plurality of abstracted raw data, which may be obtained from portions of call data associated with a plurality of calls from a corresponding plurality of originating parties (e.g., originating parties 110b-110n, or the like). In some instances, the plurality of abstracted raw data and the first abstracted raw data may each include, without limitation, at least one of word count data, phoneme count data, inter-word timing data, voice pitch estimation data, or background noise data, and/or the like. The computing system may determine whether the first abstracted raw data is indicative of the first call being a suspected unsolicited or unwanted communication, based at least in part on the comparison. Based on a determination that the first abstracted raw data is indicative of the first call being a suspected unsolicited or unwanted communication, the computing system may perform one or more tasks.

Merely by way of example, in some cases, the suspected unsolicited or unwanted communication may include, but is not limited to, at least one of a telemarketing communication, a robocall communication, or a communication instigating fraudulent activity, and/or the like. In some instances, the suspected unsolicited or unwanted communication may include, without limitation, a pre-recorded message.

In some embodiments, the portion of the call data of the first call may include, but is not limited to, at least one of: a first portion of the call data, the first portion of the call data being of a first predetermined duration; a second portion of the call data overlapping with the first portion, without an initial portion that is of a second predetermined duration; or a third portion of the call data after any of the first portion or the second portion, the third portion being of a third predetermined duration; and/or the like. In some instances, the first predetermined duration may be any suitable duration (e.g., 5, 6, 7, 8, 9, 10, 11, 12, 13, 14, or 15 seconds, or longer, or within any suitable range of time between 5 and 120 seconds, or longer, or the like), while the second predetermined duration may also be any suitable duration (e.g., 1, 2, 3, 4, or 5 seconds, or longer, or within any suitable range of time between 5 and 120 seconds, or longer, or the like), and the third predetermined duration may also be any suitable duration (e.g., 5, 6, 7, 8, 9, 10, 11, 12, 13, 14, or 15 seconds, or longer, or within any suitable range of time between 5 and 120 seconds, or longer, or the like).

According to some embodiments, the computing system may abstract raw data from the portion of the call data associated with the first call from the first originating party to produce the first abstracted raw data. In some cases, abstracting the raw data to produce the first abstracted raw data may comprise abstracting, using the computing system, raw data from the portion of the call data associated with the first call from the first originating party to produce the first abstracted raw data, without transcription of communication contained within the call data and without use of speech-to-text or text-to-speech functionality on the communication contained within the call data.

In some embodiments, comparing the first abstracted raw data with each of the plurality of abstracted raw data may comprise determining, using the computing system, one or more similarities between the first abstracted raw data and each of the plurality of abstracted raw data, based at least in part on comparison of the at least one of word count data, phoneme count data, inter-word timing data, voice pitch estimation data, or background noise data, and/or the like, that may be associated with the first abstracted raw data with the at least one of word count data, phoneme count data, inter-word timing data, voice pitch estimation data, or background noise data, and/or the like, that may be associated with each of the plurality of abstracted raw data.

According to some embodiments, comparing the first abstracted raw data with each of the plurality of abstracted raw data may further comprise generating, using the computing system, a similarity score based on the determined one or more similarities between the first abstracted raw data and each of the plurality of abstracted raw data. In some cases, determining whether the first abstracted raw data is indicative of the first call being a suspected unsolicited or unwanted communication may comprise determining that the generated similarity score is greater than a predetermined matching threshold value.

In some embodiments, determining the one or more similarities between the first abstracted raw data and each of the plurality of abstracted raw data may comprise: generating a first score based on the first abstracted raw data; comparing the first score with each of the plurality of second scores each based on a corresponding one of the plurality of abstracted raw data; and generating a similarity score for each of the plurality of second scores based on the comparison of the first score with each of the plurality of second scores; and/or the like.

In some instances, prior to comparing the first score with each of the plurality of second scores, the computing system may prune the plurality of abstracted raw data to reduce a number of second scores among the plurality of second scores that require comparison, by filtering out abstracted raw data from the plurality of abstracted raw data based at least in part on a difference in one or more of the at least one of word count data, phoneme count data, inter-word timing data, voice pitch estimation data, or background noise data, and/or the like. In some cases, the computing system may group the plurality of abstracted raw data into one or more groups characterized by similarities in each of the at least one of word count data, phoneme count data, inter-word timing data, voice pitch estimation data, or background noise data, and/or the like.

In some cases, pruning the plurality of abstracted raw data to reduce the number of second scores among the plurality of second scores that require comparison may comprise filtering out abstracted raw data from the plurality of abstracted raw data based at least in part on the one or more groups. In some instances, grouping the plurality of abstracted raw data into one or more groups may further comprise grouping the plurality of abstracted raw data into one or more groups based at least in part on at least one of one or more entities associated with previously determined sources of unsolicited or unwanted communications corresponding to abstracted raw data among the plurality of abstracted raw data, one or more groups of entities associated with previously determined sources of unsolicited or unwanted communications corresponding to abstracted raw data among the plurality of abstracted raw data, or one or more characteristics of unsolicited or unwanted communications corresponding to abstracted raw data among the plurality of abstracted raw data.

According to some embodiments, the one or more tasks may include, but are not limited to, at least one of: blocking the first call; responding to a call request that is associated with the first call with a busy signal; sending a message to the first destination party indicating that the first call is a suspected unsolicited or unwanted communication; updating a corpus of suspected robocalls to include the first abstracted raw data to the plurality of abstracted raw data; or training rapid fraud determination; and/or the like.

These and other functions of the system 100 (and its components) are described in greater detail below with respect to FIGS. 2-4.

Figure 2:
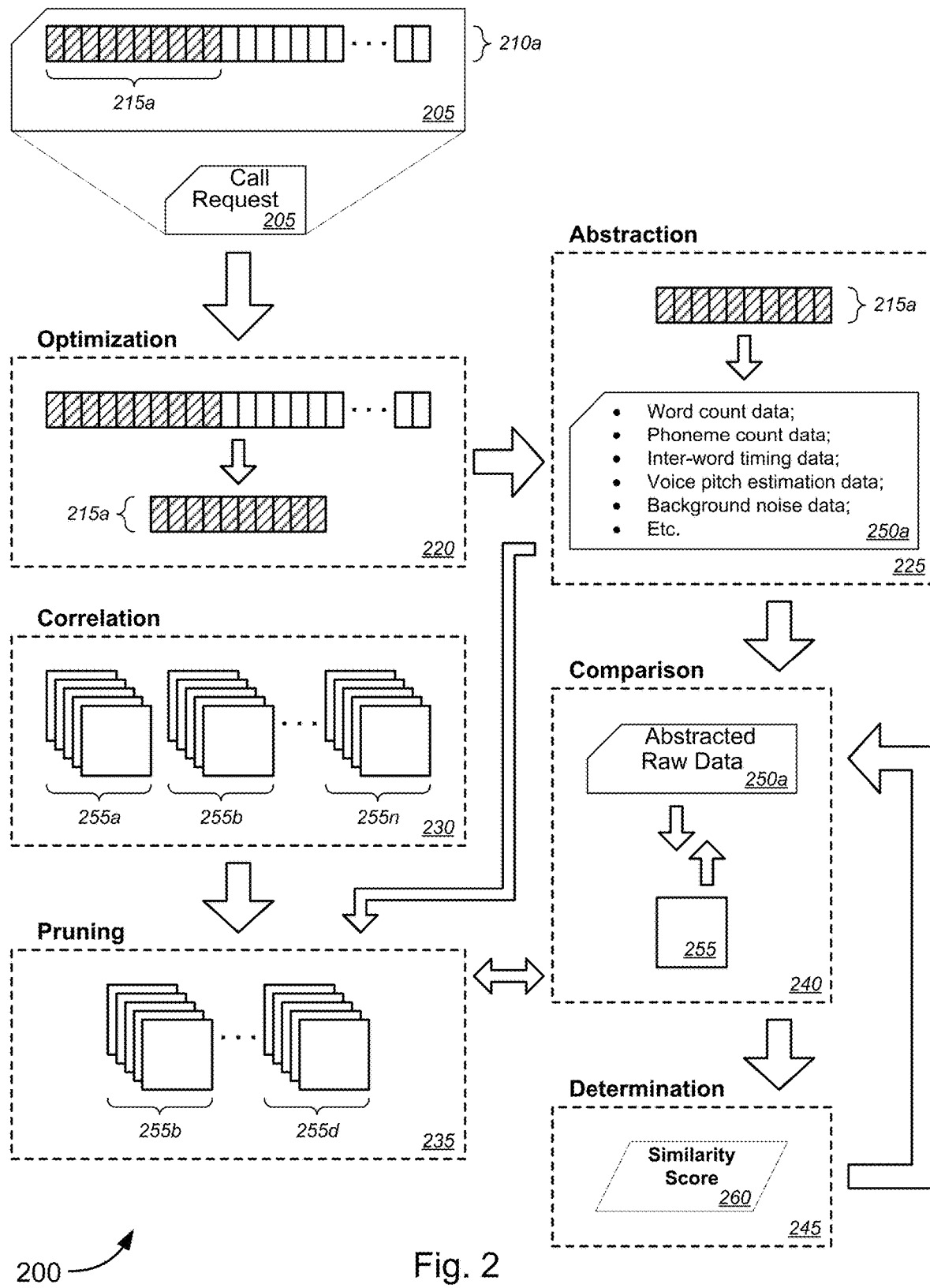
FIG. 2 is a schematic flow diagram illustrating a non-limiting example of a method for implementing automated robocall detection, in accordance with various embodiments.

FIG. 2 is a schematic flow diagram illustrating a non-limiting example 200 of a method for implementing automated robocall detection, in accordance with various embodiments.

Referring to the non-limiting example 200 of FIG. 2, a call request 205 for a call from a first originating party to a first destination party may include call data including a message 210*a*. The message 210*a* may include one or more portions, including portion 215*a* having a predetermined duration. The automated robocall detection of FIG. 2 may include processes, including, without limitation, at least one of optimization 220, abstraction 225, correlation 230, pruning 235, comparison 240, and/or determination 245, or the like.

For optimization 220, a computing system (e.g., computing system 160 and/or processor(s) 160*a* of FIG. 1, or the like) may extract portion 215*a* from the message. In some embodiments, the portion 215*a* may include, but is not limited to, at least one of: a first portion of the message 210*a*, the first portion being of a first predetermined duration; a second portion of the message 210*a* overlapping with the first portion, without an initial portion that is of a second predetermined duration; or a third portion of the message 210*a* after any of the first portion or the second portion, the third portion being of a third predetermined duration; and/or the like. In some instances, the first predetermined duration may be any suitable duration (e.g., 5, 6, 7, 8, 9, 10, 11, 12, 13, 14, or 15 seconds, or longer, or within any suitable range of time between 5 and 120 seconds, or longer, or the like), while the second predetermined duration may be any suitable duration (e.g., 1, 2, 3, 4, or 5 seconds, or longer, or within any suitable range of time between 5 and 120 seconds, or longer, or the like), and the third predetermined duration may be any suitable duration (e.g., 5, 6, 7, 8, 9, 10, 11, 12, 13, 14, or 15 seconds, or longer, or within any suitable range of time between 5 and 120 seconds, or longer, or the like). As shown in the non-limiting example of FIG. 2, portion 215*a* may be a first portion having a first duration, e.g., of 10 s, or the like.

For abstraction 225, the computing system (e.g., computing system 160, processor(s) 160*a*, and/or VAD 160*b* of FIG. 1, or the like) may abstract, from the portion 215*a*, first abstracted raw data 250*a*, which may each include, without limitation, at least one of word count data, phoneme count data, inter-word timing data, voice pitch estimation data, or background noise data, and/or the like.

For correlation 230, the computing system (e.g., computing system 160, processor(s) 160a, and/or correlation engine 160c of FIG. 1, or the like) may correlate or group the plurality of abstracted raw data into one or more groups 255a, 255b, through 255n (collectively, "groups 255" or the like) characterized by similarities in each of the at least one of word count data, phoneme count data, inter-word timing data, voice pitch estimation data, or background noise data, and/or the like. In some instances, grouping the plurality of abstracted raw data into one or more groups may further comprise grouping the plurality of abstracted raw data into one or more groups based at least in part on at least one of one or more entities associated with previously determined sources of unsolicited or unwanted communications corresponding to abstracted raw data among the plurality of abstracted raw data, one or more groups of entities associated with previously determined sources of unsolicited or unwanted communications corresponding to abstracted raw data among the plurality of abstracted raw data, or one or more characteristics of unsolicited or unwanted communications corresponding to abstracted raw data among the plurality of abstracted raw data.

For pruning 235, the computing system (e.g., computing system 160 and/or processor(s) 160a of FIG. 1, or the like) may prune the plurality of abstracted raw data to reduce a number of second scores among the plurality of second scores that require comparison (e.g., to groups 255b-255d as shown in FIG. 2, or the like), in some cases, by filtering out abstracted raw data from the plurality of abstracted raw data based at least in part on a difference in one or more of the at least one of word count data, phoneme count data, inter-word timing data, voice pitch estimation data, or background noise data, and/or the like. Alternatively, or additionally, pruning the plurality of abstracted raw data to reduce the number of second scores among the plurality of second scores that require comparison may comprise filtering out abstracted raw data from the plurality of abstracted raw data based at least in part on the one or more groups.

For comparison 240, the computing system (e.g., computing system 160 and/or processor(s) 160a of FIG. 1, or the like) may compare first abstracted raw data 250a with each of a plurality of pruned abstracted raw data 255 among the pruned groups (e.g., groups 255b-255d, or the like).

For determination 245, the computing system (e.g., computing system 160 and/or processor(s) 160a of FIG. 1, or the like) may determine whether the first abstracted raw data 250a is indicative of the call being a suspected unsolicited or unwanted communication, based at least in part on the comparison. In some cases, determining whether the first abstracted raw data 250a is indicative of the call being a suspected unsolicited or unwanted communication may comprise generating, using the computing system, a similarity score 260 based on the determined one or more similarities between the first abstracted raw data 250a and each of the plurality of pruned abstracted raw data 255 (and repeating the comparison 240 for each subsequent one of the plurality of pruned abstracted raw data 255, as depicted in FIG. 2). In some cases, determining whether the first abstracted raw data is indicative of the first call being a suspected unsolicited or unwanted communication may comprise determining that the generated similarity score 260 is greater than a predetermined matching threshold value.

In some embodiments, determining the one or more similarities between the first abstracted raw data and each of the plurality of abstracted raw data may comprise: generating a first score based on the first abstracted raw data; comparing the first score with each of the plurality of second scores each based on a corresponding one of the plurality of abstracted raw data; and generating a similarity score 260 for each of the plurality of second scores based on the comparison of the first score with each of the plurality of second scores; and/or the like.

Based on a determination that the first abstracted raw data is indicative of the first call being a suspected unsolicited or unwanted communication, the computing system may perform one or more tasks. According to some embodiments, the one or more tasks may include, but are not limited to, at least one of: blocking the first call; responding to a call request that is associated with the first call with a busy signal; sending a message to the first destination party indicating that the first call is a suspected unsolicited or unwanted communication; updating a corpus of suspected robocalls to include the first abstracted raw data to the plurality of abstracted raw data; or training rapid fraud determination; and/or the like.

These and other functions are described in greater detail below with respect to FIGS. 1, 3, and 4.

Figure 3:
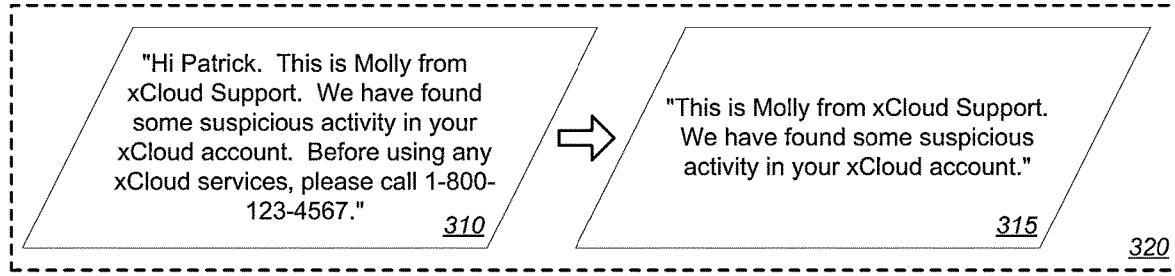
FIG. 3 is a schematic flow diagram illustrating a non-limiting example of call data that may be processed during implementation of automated robocall detection, in accordance with various embodiments.
Figure 3:
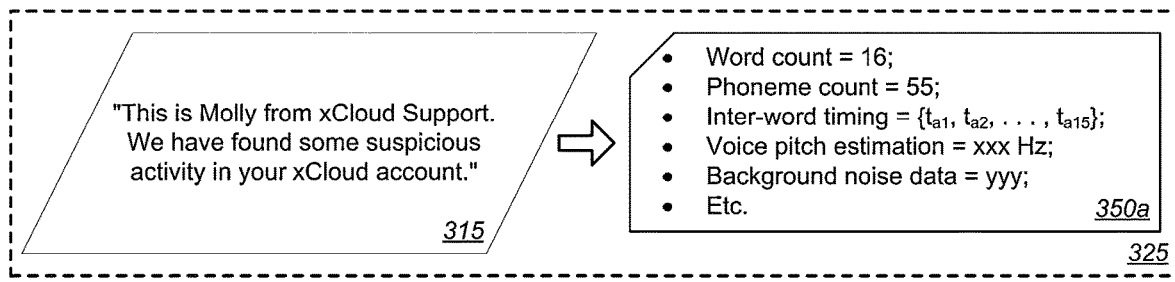
Figure 3:
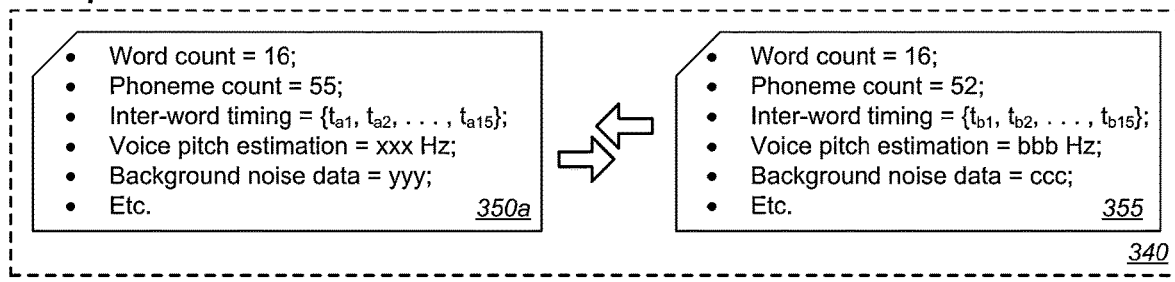
Figure 3:
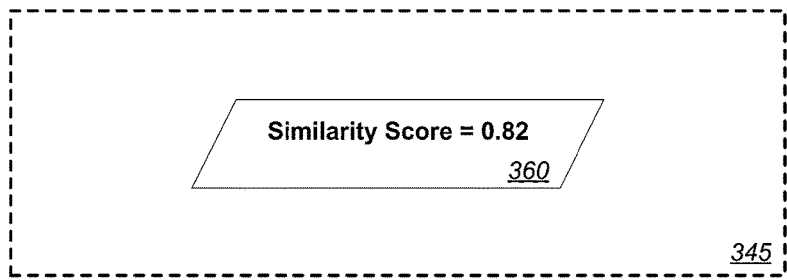

FIG. 3 is a schematic flow diagram illustrating a non-limiting example 300 of call data that may be processed during implementation of automated robocall detection, in accordance with various embodiments.

With reference to the non-limiting example 300 of FIG. 3, automated robocall detection may include processes, including, without limitation, at least one of optimization 320, abstraction 325, comparison 340, and/or determination 345, or the like.

For optimization 320, a computing system (e.g., computing system 160 and/or processor(s) 160a of FIG. 1, or the like) may extract portion 315 from a first message 310, which may be contained within a call request for a call from a first originating party to a first destination party. For instance, the portion 315 may be a ten second (10 s) portion that is extracted from the start of the first message 310, except without the initial few seconds that are directed to the first destination party (in some cases, including the name of the first destination party). For example, as shown in FIG. 3, the portion 315 may include an extracted message such as, but not limited to: "This is Molly from xCloud Support. We have found some suspicious activity in your xCloud account." To determine whether the first message 310 is an unsolicited or unwanted communication (or a suspected one), the portion 315 may be processed using at least abstraction 325, comparison 340, and/or determination 345, or the like.

For abstraction 325, the computing system (e.g., computing system 160, processor(s) 160a, and/or VAD 160b of FIG. 1, or the like) may abstract, from the portion 315, first abstracted raw data 350a, which may each include, without limitation, at least one of word count data (in this case, "word count=16" or the like), phoneme count data (in this case, "phoneme count=55" or the like), inter-word timing data (in this case, values for each of {tai, tat, . . . , tats}, or the like), voice pitch estimation data (in this case, values for xxx Hz, or the like), or background noise data (in this case, values for yyy, or the like), and/or the like.

For comparison 340, the computing system (e.g., computing system 160 and/or processor(s) 160a of FIG. 1, or the like) may compare first abstracted raw data 350a with each of a plurality of abstracted raw data (e.g., the plurality of pruned abstracted raw data 255, or the like). For example, a non-limiting one of the abstracted raw data 355 among the plurality of abstracted raw data (as shown in FIG. 3), similar to the first abstracted raw data 350a, may include, but is not limited to, at least one of word count data (in this case, "word count=16" or the like), phoneme count data (in this case, "phoneme count=52" or the like), inter-word timing data (in this case, values for each of $\{t_{b1}, t_{b2}, \ldots, t_{b15}\}$, or the like), voice pitch estimation data (in this case, values for bbb Hz, or the like), or background noise data (in this case, values for ccc, or the like), and/or the like.

For determination 345, the computing system (e.g., computing system 160 and/or processor(s) 160a of FIG. 1, or the like) may determine whether the first abstracted raw data 350a is indicative of the call being a suspected unsolicited or unwanted communication, based at least in part on the comparison, in some cases, by generating a similarity score 360 (in this case, "similarity score=0.82" or the like) based on the determined one or more similarities between the first abstracted raw data 350a and each of the plurality of abstracted raw data (and repeating the comparison 340 for each subsequent one of the plurality of abstracted raw data 355, as depicted in FIG. 3). In some cases, determining whether the first abstracted raw data is indicative of the first call being a suspected unsolicited or unwanted communication may comprise determining that the generated similarity score 360 is greater than a predetermined matching threshold value (e.g., 0.70, 0.75. 0.80, 0.85, 0.90, or 0.95, or the like).

In some embodiments, raw data may include, without limitation, at least one of an identifier ("ID") number, number of phonemes, background noise ("BN") value, inter-word timing ("t") values, and/or the like. In another non-limiting example, raw data may include values as follows: ID #: 235298; # of phonemes: 55; BN: 0.76298; t: 123 ms, 400 ms, 2300 ms, 2800 ms, . . . , 6000 ms; etc.

In various embodiments, determining whether the call from the first originating party is a suspected unsolicited or unwanted communication may be based on whether it is either a robocall or a call including a pre-recorded message. In such cases, comparing the first abstracted raw data from the extracted portion of the message of the first call with corresponding abstracted raw data from previously determined suspected unsolicited or unwanted communication (which may be stored in database 165 of FIG. 1, or the like).

For instance, a first abstracted raw data having the same or similar word count as one or more abstracted raw data among the plurality of (pruned) abstracted raw data is a factor at least in part indicative of a suspected unsolicited or unwanted communication. A first abstracted raw data having the same or similar phoneme count as one or more abstracted raw data among the plurality of (pruned) abstracted raw data is another factor at least in part indicative of a suspected unsolicited or unwanted communication. The combination of word count and phoneme count being the same or similar is a greater indication of a suspected unsolicited or unwanted communication. A first abstracted raw data having the same or similar inter-word timing as one or more abstracted raw data among the plurality of (pruned) abstracted raw data is yet another factor at least in part indicative of a suspected unsolicited or unwanted communication. Because it is difficult for a human to replicate inter-word timing for messages over multiple calls, even if the message is the same, the combination of word count, phoneme count, and/or inter-word timing being the same or similar is an even greater indication of a suspected unsolicited or unwanted communication (i.e., indicative of a robocall and/or a pre-recorded message, or the like). A first abstracted raw data having the same or similar voice pitch estimation as one or more abstracted raw data among the plurality of (pruned) abstracted raw data is still another factor at least in part indicative of a suspected unsolicited or unwanted communication. Because voice pitch may be different for different people based on differences in male and female voices, differences among different male voices, differences among different female voices, differences among people of different ages, etc., the voice pitch being the same or similar is a strong indication of a suspected unsolicited or unwanted communication. A first abstracted raw data having the same or similar background noise as one or more abstracted raw data among the plurality of (pruned) abstracted raw data is another factor at least in part indicative of a suspected unsolicited or unwanted communication. In some cases, some parties associated with unsolicited or unwanted communication may use noise to make call recording difficult. In some instances, such noise may serve as a signature for these parties, and thus the background noise being the same or similar is another strong indication of a suspected unsolicited or unwanted communication.

In some aspects, automated robocall detection may be determined in near-real-time.

These and other functions are described in greater detail below with respect to FIGS. 1, 2, and 4.

Figure 4A:
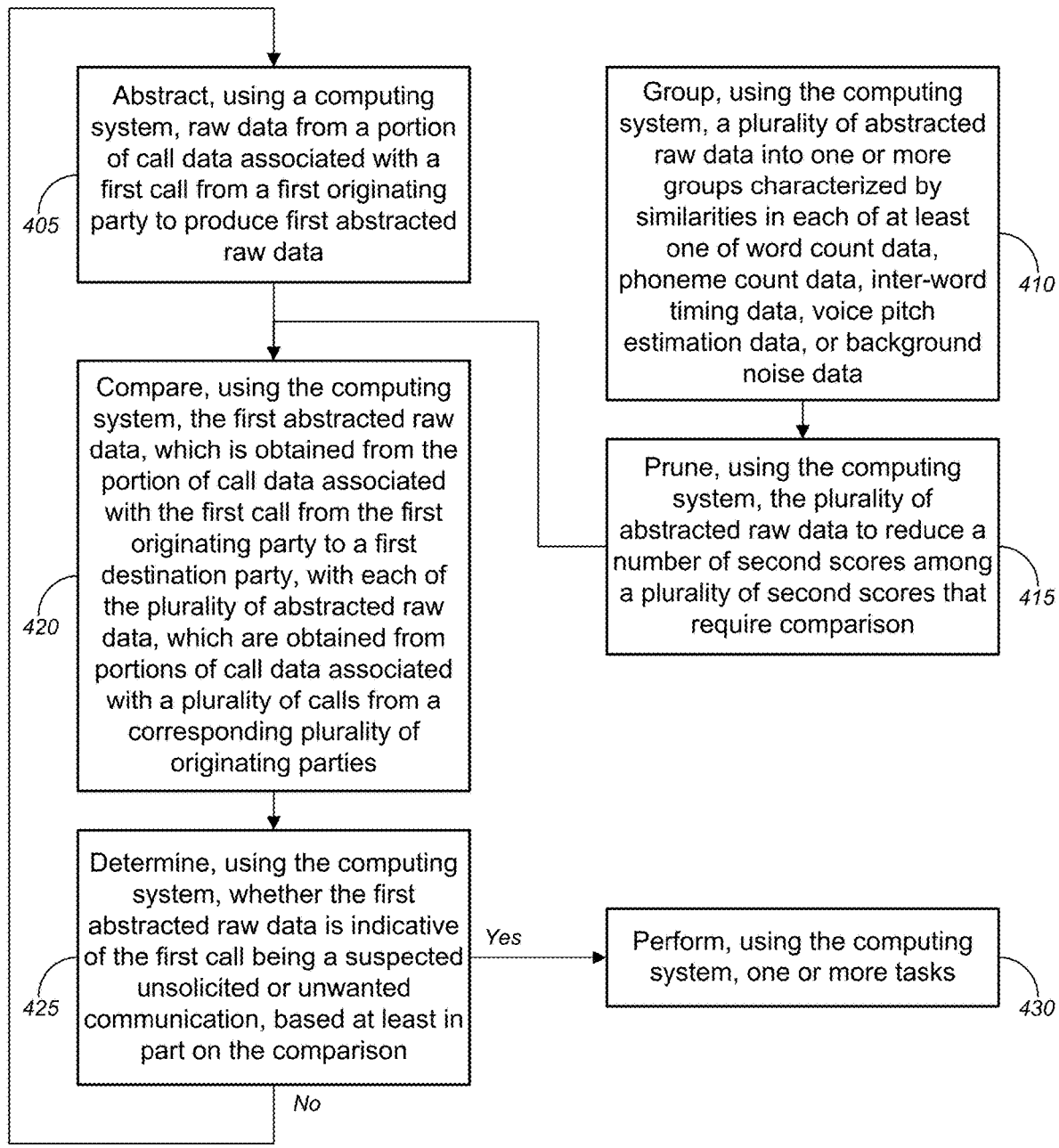
FIGS. 4A-4C are flow diagrams illustrating a method for implementing automated robocall detection, in accordance with various embodiments.
Figure 4B:
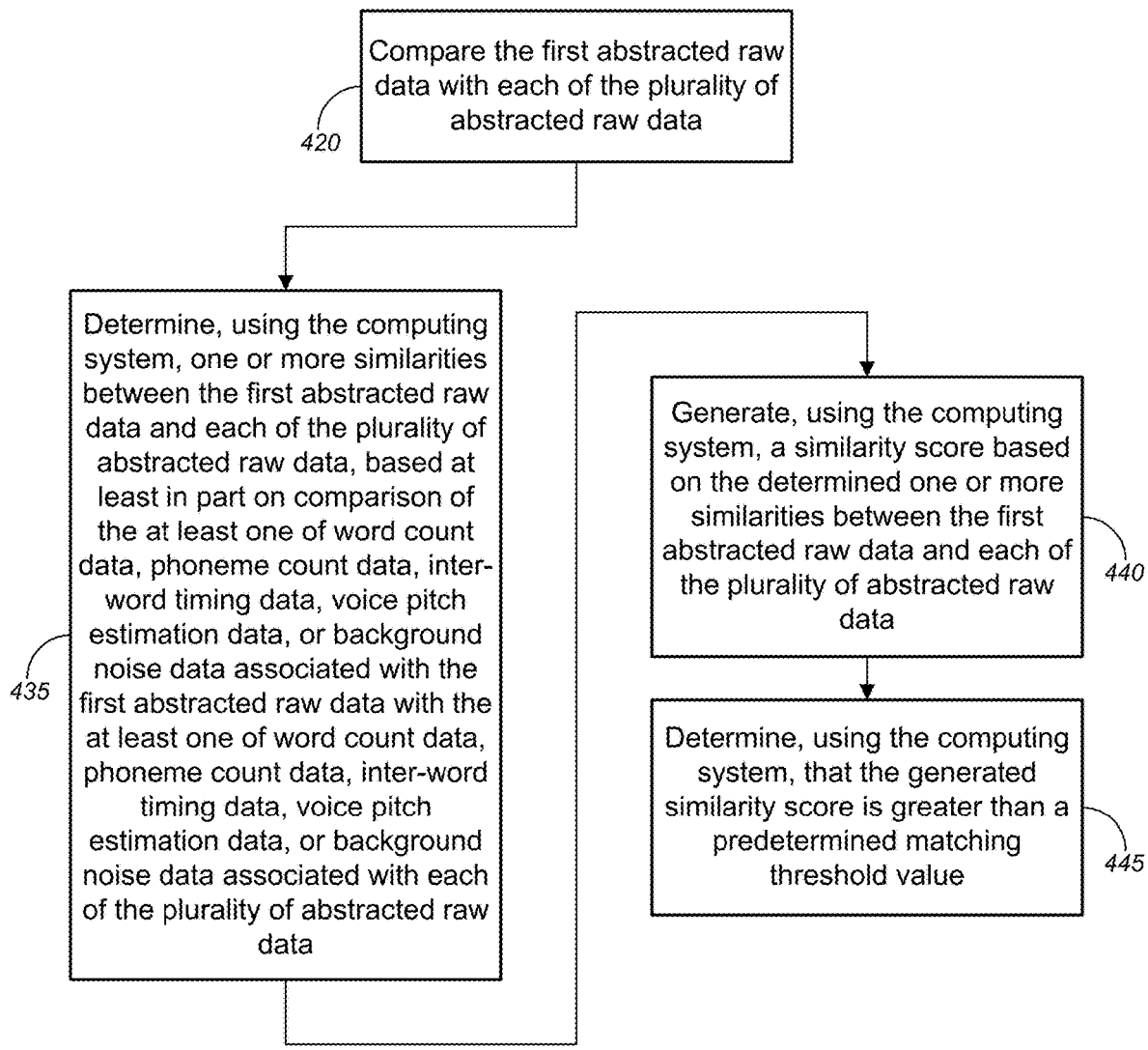
Figure 4C:
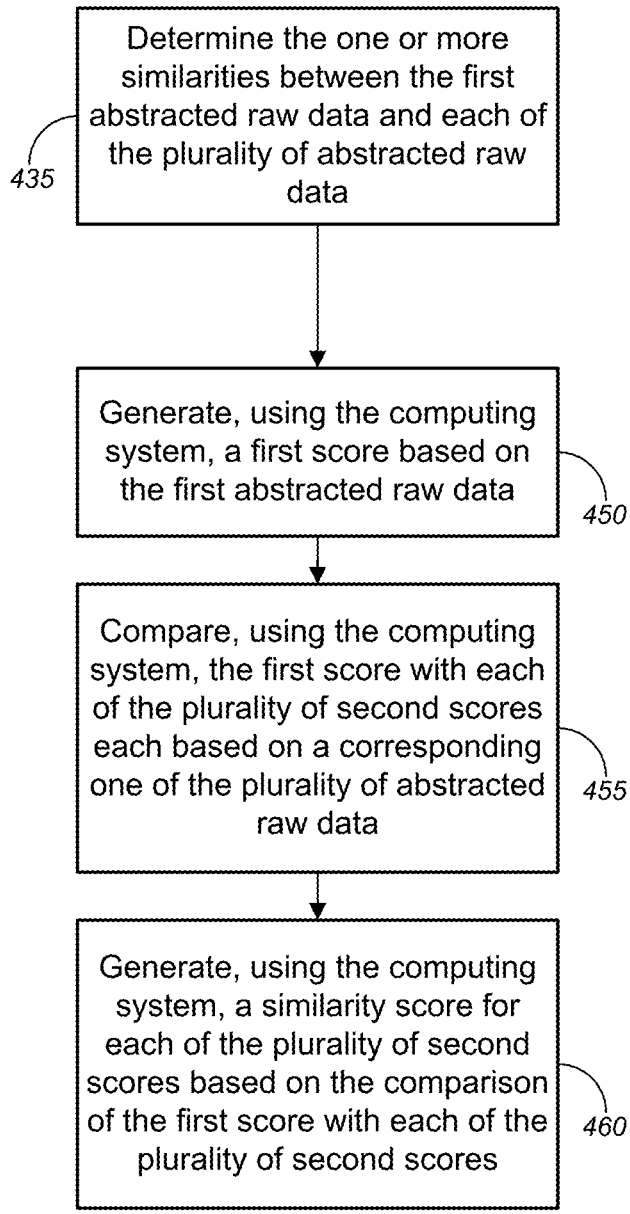

FIGS. 4A-4C (collectively, "FIG. 4") are flow diagrams illustrating a method 400 for implementing automated robocall detection, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 405, may comprise abstracting, using a computing system, raw data from a portion of call data associated with a first call from a first originating party to produce first abstracted raw data. According to some embodiments, abstracting the raw data to produce the first abstracted raw data may comprise abstracting, using the computing system, raw data from the portion of the call data associated with the first call from the first originating party to produce the first abstracted raw data, without transcription of communication contained within the call data and without use of speech-to-text or text-to-speech functionality on the communication contained within the call data.

In some embodiments, the computing system may include, without limitation, at least one of one or more central processing units ("CPUs"), one or more graphics processing units ("GPUs"), one or more data processing units ("DPUs"), one or more tensor processing units ("TPUs"), a systolic array, a field-programmable gate array ("FPGA"), a correlation engine, a voice activity detection ("VAD") system, an application-specific integrated circuit ("ASIC") system, a call server, a call detail record ("CDR") system, a call controller, a call manager, a media gateway controller, a video call server, an instant messaging server, a centralized server, or a distributed computing system, and/or the like. In some instances, the first call may include, but is not limited to, one of a session initiation protocol ("SIP")-based communication, a public switched telephone network ("PSTN") communication, or a plain old telephone service ("POTS") communication, and/or the like. In some cases, the SIP-based communication may include, without limitation, at least one of a voice over Internet Protocol ("VoIP") call, an IP-based video call, or an instant message over IP, and/or the like.

At block 410, method 400 may comprise grouping, using the computing system, a plurality of abstracted raw data into one or more groups. In some instances, the plurality of abstracted raw data and the first abstracted raw data may each include, but is not limited to, at least one of word count data, phoneme count data, inter-word timing data, voice pitch estimation data, or background noise data, and/or the like. In some embodiments, grouping the plurality of abstracted raw data may comprise grouping into one or more groups characterized by similarities in each of at least one of word count data, phoneme count data, inter-word timing data, voice pitch estimation data, or background noise data, and/or the like. Alternatively, or additionally, grouping the plurality of abstracted raw data into one or more groups may further comprise grouping the plurality of abstracted raw data into one or more groups based at least in part on at least one of one or more entities associated with previously determined sources of unsolicited or unwanted communications corresponding to abstracted raw data among the plurality of abstracted raw data, one or more groups of entities associated with previously determined sources of unsolicited or unwanted communications corresponding to abstracted raw data among the plurality of abstracted raw data, or one or more characteristics of unsolicited or unwanted communications corresponding to abstracted raw data among the plurality of abstracted raw data, and/or the like.

According to some embodiments, the suspected unsolicited or unwanted communication may include, without limitation, at least one of a telemarketing communication, a robocall communication, or a communication instigating fraudulent activity, and/or the like. Alternatively, or additionally, the suspected unsolicited or unwanted communication may include a pre-recorded message. In some instances, the portion of the call data of the first call may include, but is not limited to, at least one of: a first portion of the call data, the first portion of the call data being of a first predetermined duration; a second portion of the call data overlapping with the first portion, without an initial portion that is of a second predetermined duration; or a third portion of the call data after any of the first portion or the second portion, the third portion being of a third predetermined duration; and/or the like. In some cases, the first predetermined duration may be any suitable duration (e.g., 5, 6, 7, 8, 9, 10, 11, 12, 13, 14, or 15 seconds, or longer, or within any suitable range of time between 5 and 120 seconds, or longer, or the like), while the second predetermined duration may also be any suitable duration (e.g., 1, 2, 3, 4, or 5 seconds, or longer, or within any suitable range of time between 5 and 120 seconds, or longer, or the like), and the third predetermined duration may also be any suitable duration (e.g., 5, 6, 7, 8, 9, 10, 11, 12, 13, 14, or 15 seconds, or longer, or within any suitable range of time between 5 and 120 seconds, or longer, or the like).

Method 400 may further comprise, at block 415, pruning, using the computing system, the plurality of abstracted raw data to reduce a number of second scores among a plurality of second scores that require comparison. In some embodiments, pruning the plurality of abstracted raw data to reduce the number of second scores among the plurality of second scores that require comparison may comprise filtering out abstracted raw data from the plurality of abstracted raw data based at least in part on a difference in one or more of the at least one of word count data, phoneme count data, inter-word timing data, voice pitch estimation data, or background noise data, and/or the like. Alternatively, or additionally, pruning the plurality of abstracted raw data to reduce the number of second scores among the plurality of second scores that require comparison may comprise filtering out abstracted raw data from the plurality of abstracted raw data based at least in part on the one or more groups.

Method 400 may comprise, at block 420, comparing, using the computing system, the first abstracted raw data, which is obtained from the portion of call data associated with the first call from the first originating party to a first destination party, with each of the plurality of abstracted raw data, which are obtained from portions of call data associated with a plurality of calls from a corresponding plurality of originating parties. Method 400 may further comprise determining, using the computing system, whether the first abstracted raw data is indicative of the first call being a suspected unsolicited or unwanted communication, based at least in part on the comparison (block 425). If not, method 400 may return to the process of block 405 for a subsequent call. If so, method 400 may proceed to the process of block 430.

At block 425, method 400 may comprise, based on a determination that the first abstracted raw data is indicative of the first call being a suspected unsolicited or unwanted communication, performing, using the computing system, one or more tasks. According to some embodiments, the one or more tasks may include, but are not limited to, at least one of: blocking the first call; responding to a call request that is associated with the first call with a busy signal; sending a message to the first destination party indicating that the first call is a suspected unsolicited or unwanted communication; updating a corpus of suspected robocalls to include the first abstracted raw data to the plurality of abstracted raw data; or training rapid fraud determination; and/or the like.

With reference to FIG. 4B, comparing the first abstracted raw data with each of the plurality of abstracted raw data (at block 420) may comprise determining, using the computing system, one or more similarities between the first abstracted raw data and each of the plurality of abstracted raw data, based at least in part on comparison of the at least one of word count data, phoneme count data, inter-word timing data, voice pitch estimation data, or background noise data, and/or the like, that is associated with the first abstracted raw data with the at least one of word count data, phoneme count data, inter-word timing data, voice pitch estimation data, or background noise data, and/or the like, that is associated with each of the plurality of abstracted raw data (block 435). Method 400, at block 440, may comprise generating, using the computing system, a similarity score based on the determined one or more similarities between the first abstracted raw data and each of the plurality of abstracted raw data. In some instances, determining whether the first abstracted raw data is indicative of the first call being a suspected unsolicited or unwanted communication may comprise determining, using the computing system, that the generated similarity score is greater than a predetermined matching threshold value (block 445).

Turning to FIG. 4C, determining the one or more similarities between the first abstracted raw data and each of the plurality of abstracted raw data (at block 435) may comprise: generating, using the computing system, a first score based on the first abstracted raw data (block 450); comparing, using the computing system, the first score with each of the plurality of second scores each based on a corresponding one of the plurality of abstracted raw data (block 455); and generating, using the computing system, a similarity score for each of the plurality of second scores based on the comparison of the first score with each of the plurality of second scores (block 460).

Exemplary System and Hardware Implementation

Figure 5:
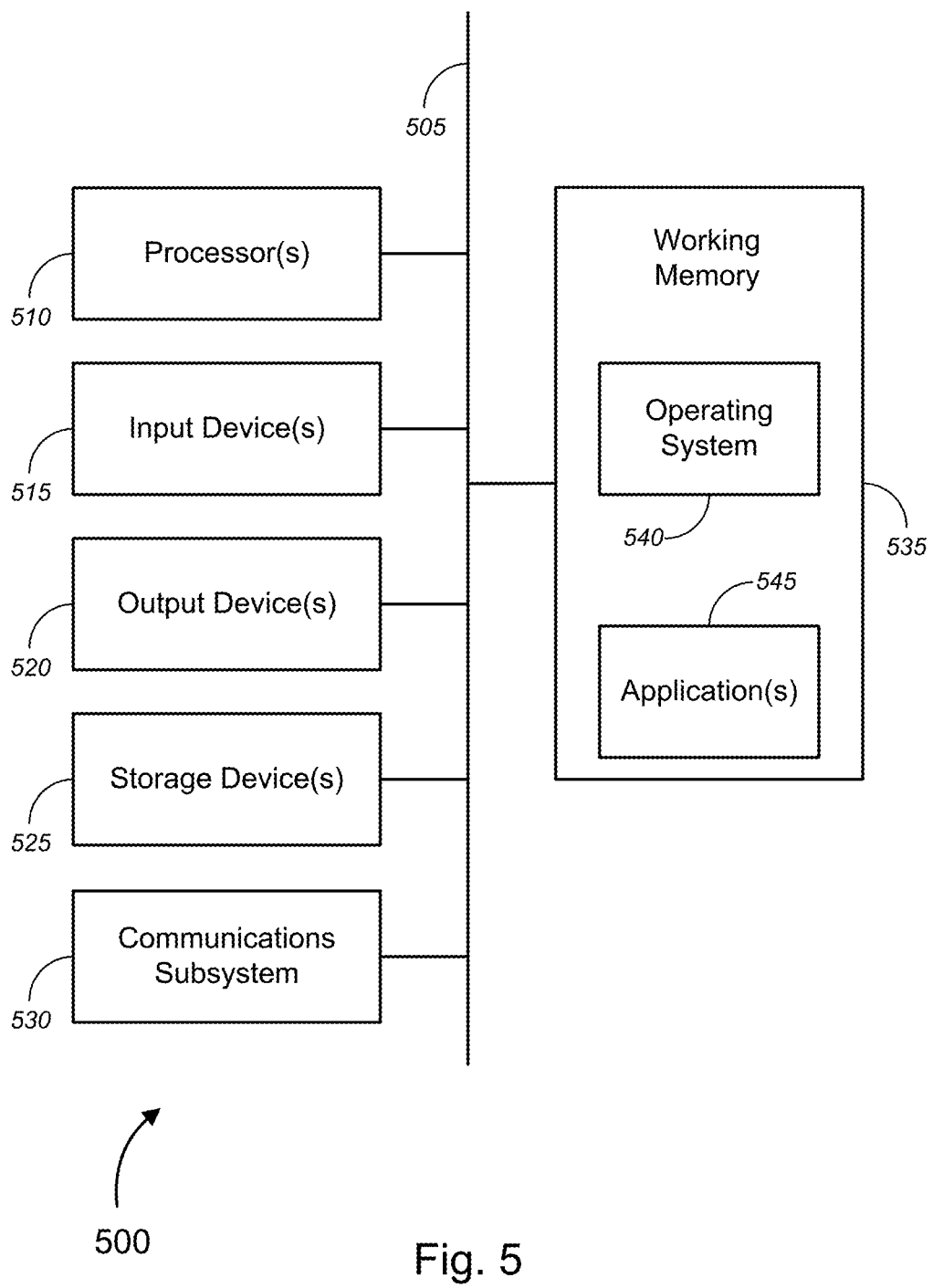
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., calling devices 105 and 105*a*-105*e*, called devices 125 and 125*a*-125*e*, ingress nodes 150*a*-150*n*, egress nodes 155*a*-155*n*, computing systems 160, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner. The computer or hardware system 500—which might represent an embodiment of the computer or hardware system (i.e., calling devices 105 and 105*a*-105*e*, called devices 125 and 125*a*-125*e*, ingress nodes 150*a*-150*n*, egress nodes 155*a*-155*n*, computing systems 160, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
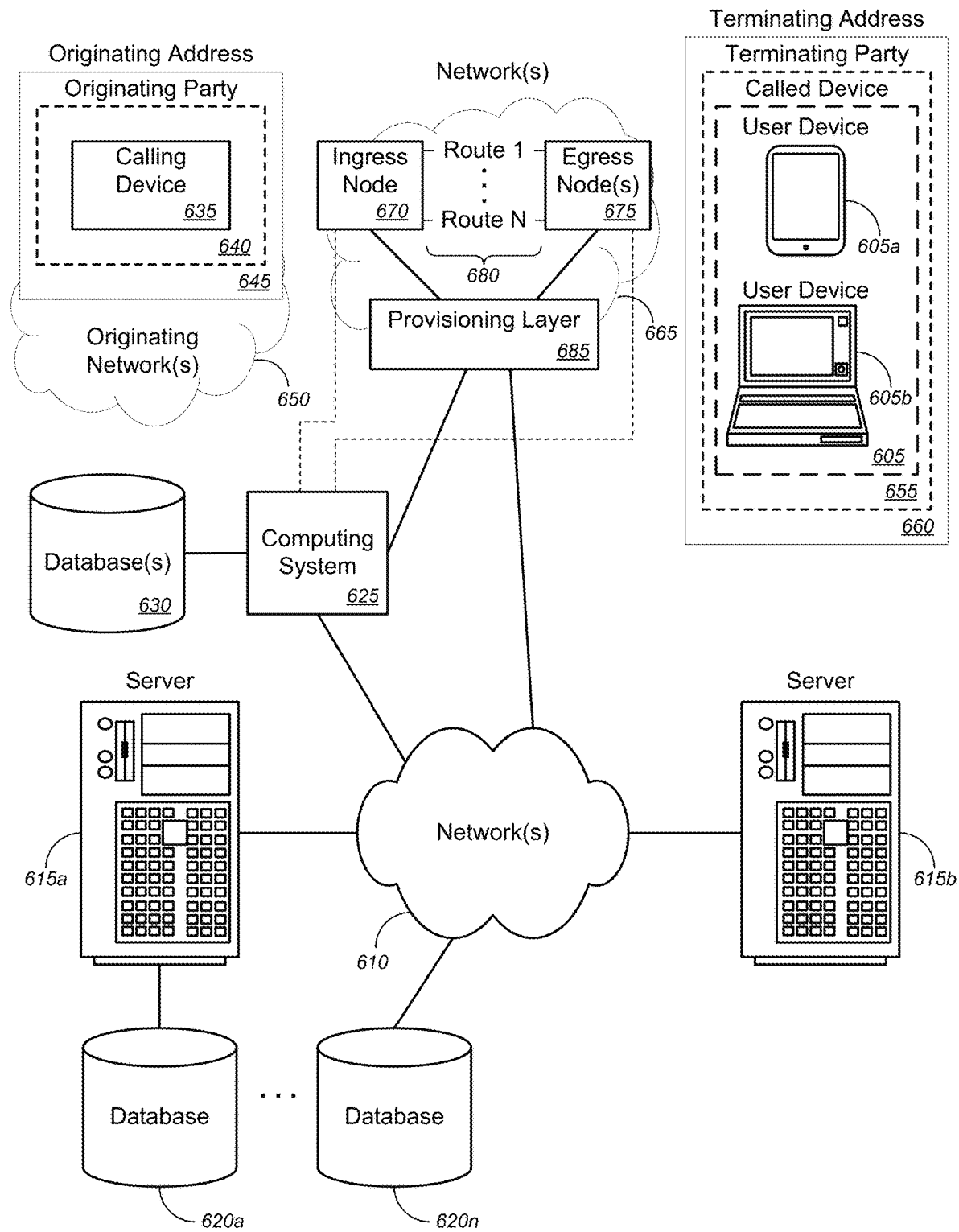
FIG. 6 is a block diagram illustrating a networked system of computers, computing systems, or system hardware architecture, which can be used in accordance with various embodiments.

As noted above, a set of embodiments comprises methods and systems for implementing call service provisioning, and, more particularly, to methods, systems, and apparatuses for implementing automated robocall detection. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™ IPX™' AppleTalk™, and the like. Merely by way of example, the network(s) 610 (similar to network(s) 120, 140, and 145 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing call service provisioning, and, more particularly, to methods, systems, and apparatuses for implementing automated robocall detection, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 160 of FIG. 1, or the like) and database(s) 630 (similar to database(s) 165 of FIG. 1, or the like). System 600 may further comprise a calling device 635 (similar to calling devices 105 and 105a-105e of FIG. 1, or the like) that is associated with an originating party 640 (similar to originating parties 110a-110n of FIG. 1, or the like) at an originating address 645 (similar to originating addresses 115a-115n of FIG. 1, or the like) in originating network(s) 650 (similar to originating network(s) 120 of FIG. 1, or the like), a called device 605 (including user devices 605a and 605b, or the like; similar to called devices 125 and 125a-125e of FIG. 1, or the like) that is associated with a terminating party 655 (similar to terminating parties 130a-130n of FIG. 1, or the like) at a terminating address 660 (similar to terminating addresses 135a-135n of FIG. 1, or the like) in network(s) 665 (similar to network 145 of FIG. 1, or the like). System 600 may further comprise ingress node 670 (similar to ingress nodes 150a-150n of FIG. 1, or the like), egress node 675 (similar to egress nodes 155a-155n of FIG. 1, or the like), and provisioning layer 685 (similar to provisioning layer 170 of FIG. 1, or the like), each disposed in network(s) 665.

In operation, a computing system (e.g., computing system 625, or the like) may compare first abstracted raw data, which may be obtained from a portion of call data associated with a first call from a first originating party (e.g., originating party 640, or the like) to a first destination party (e.g., terminating party 655, or the like), with each of a plurality of abstracted raw data, which may be obtained from portions of call data associated with a plurality of calls from a corresponding plurality of originating parties. In some instances, the plurality of abstracted raw data and the first abstracted raw data may each include, without limitation, at least one of word count data, phoneme count data, interword timing data, voice pitch estimation data, or background noise data, and/or the like. The computing system may determine whether the first abstracted raw data is indicative of the first call being a suspected unsolicited or unwanted communication, based at least in part on the comparison. Based on a determination that the first abstracted raw data is indicative of the first call being a suspected unsolicited or unwanted communication, the computing system may perform one or more tasks.

Merely by way of example, in some cases, the suspected unsolicited or unwanted communication may include, but is not limited to, at least one of a telemarketing communication, a robocall communication, or a communication instigating fraudulent activity, and/or the like. In some instances, the suspected unsolicited or unwanted communication may include, without limitation, a pre-recorded message.

In some embodiments, the portion of the call data of the first call may include, but is not limited to, at least one of: a first portion of the call data, the first portion of the call data being of a first predetermined duration; a second portion of the call data overlapping with the first portion, without an initial portion that is of a second predetermined duration; or a third portion of the call data after any of the first portion or the second portion, the third portion being of a third predetermined duration; and/or the like. In some instances, the first predetermined duration may be any suitable duration (e.g., 5, 6, 7, 8, 9, 10, 11, 12, 13, 14, or 15 seconds, or longer, or within any suitable range of time between 5 and 120 seconds, or longer, or the like), while the second predetermined duration may also be any suitable duration (e.g., 1, 2, 3, 4, or 5 seconds, or longer, or within any suitable range of time between 5 and 120 seconds, or longer, or the like), and the third predetermined duration may also be any suitable duration (e.g., 5, 6, 7, 8, 9, 10, 11, 12, 13, 14, or 15 seconds, or longer, or within any suitable range of time between 5 and 120 seconds, or longer, or the like).

According to some embodiments, the computing system may abstract raw data from the portion of the call data associated with the first call from the first originating party to produce the first abstracted raw data. In some cases, abstracting the raw data to produce the first abstracted raw data may comprise abstracting, using the computing system, raw data from the portion of the call data associated with the first call from the first originating party to produce the first abstracted raw data, without transcription of communication contained within the call data and without use of speech-to-text or text-to-speech functionality on the communication contained within the call data.

In some embodiments, comparing the first abstracted raw data with each of the plurality of abstracted raw data may comprise determining, using the computing system, one or more similarities between the first abstracted raw data and each of the plurality of abstracted raw data, based at least in part on comparison of the at least one of word count data, phoneme count data, inter-word timing data, voice pitch estimation data, or background noise data, and/or the like, that may be associated with the first abstracted raw data with the at least one of word count data, phoneme count data, inter-word timing data, voice pitch estimation data, or background noise data, and/or the like, that may be associated with each of the plurality of abstracted raw data.

According to some embodiments, comparing the first abstracted raw data with each of the plurality of abstracted raw data may further comprise generating, using the computing system, a similarity score based on the determined one or more similarities between the first abstracted raw data and each of the plurality of abstracted raw data. In some cases, determining whether the first abstracted raw data is indicative of the first call being a suspected unsolicited or unwanted communication may comprise determining that the generated similarity score is greater than a predetermined matching threshold value.

In some embodiments, determining the one or more similarities between the first abstracted raw data and each of the plurality of abstracted raw data may comprise: generating a first score based on the first abstracted raw data; comparing the first score with each of the plurality of second scores each based on a corresponding one of the plurality of abstracted raw data; and generating a similarity score for each of the plurality of second scores based on the comparison of the first score with each of the plurality of second scores; and/or the like.

In some instances, prior to comparing the first score with each of the plurality of second scores, the computing system may prune the plurality of abstracted raw data to reduce a number of second scores among the plurality of second scores that require comparison, by filtering out abstracted raw data from the plurality of abstracted raw data based at least in part on a difference in one or more of the at least one of word count data, phoneme count data, inter-word timing data, voice pitch estimation data, or background noise data, and/or the like. In some cases, the computing system may group the plurality of abstracted raw data into one or more groups characterized by similarities in each of the at least one of word count data, phoneme count data, inter-word timing data, voice pitch estimation data, or background noise data, and/or the like.

In some cases, pruning the plurality of abstracted raw data to reduce the number of second scores among the plurality of second scores that require comparison may comprise filtering out abstracted raw data from the plurality of abstracted raw data based at least in part on the one or more groups. In some instances, grouping the plurality of abstracted raw data into one or more groups may further comprise grouping the plurality of abstracted raw data into one or more groups based at least in part on at least one of one or more entities associated with previously determined sources of unsolicited or unwanted communications corresponding to abstracted raw data among the plurality of abstracted raw data, one or more groups of entities associated with previously determined sources of unsolicited or unwanted communications corresponding to abstracted raw data among the plurality of abstracted raw data, or one or more characteristics of unsolicited or unwanted communications corresponding to abstracted raw data among the plurality of abstracted raw data.

According to some embodiments, the one or more tasks may include, but are not limited to, at least one of: blocking the first call; responding to a call request that is associated with the first call with a busy signal; sending a message to the first destination party indicating that the first call is a suspected unsolicited or unwanted communication; updating a corpus of suspected robocalls to include the first abstracted raw data to the plurality of abstracted raw data; or training rapid fraud determination; and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, by a computing system, a first call from an originating party intended for a first destination party;
comparing, using the computing system, first abstracted raw data, which is obtained from a portion of call data associated with the first call, with each of a plurality of abstracted raw data, which are obtained from portions of call data associated with a plurality of calls from a corresponding plurality of originating parties, the plurality of abstracted raw data and the first abstracted raw data each comprising at least one of word count data, phoneme count data, inter-word timing data, voice pitch estimation data, or background noise data;
determining, using the computing system, whether the first abstracted raw data is indicative of the first call being a suspected unsolicited or unwanted communication, based at least in part on the comparison; and
based on a determination that the first abstracted raw data is not indicative of the first call being a suspected unsolicited or unwanted communication, connecting the first call to the first destination party, and
based on a determination that the first abstracted raw data is indicative of the first call being a suspected unsolicited or unwanted communication, performing, using the computing system, one or more tasks.

2. The method of claim 1, wherein the computing system comprises at least one of one or more central processing units ("CPUs"), one or more graphics processing units ("GPUs"), one or more data processing units ("DPUs"), one or more tensor processing units ("TPUs"), a systolic array, a field-programmable gate array ("FPGA"), a correlation engine, a voice activity detection ("VAD") system, an application-specific integrated circuit ("ASIC") system, a call server, a call detail record ("CDR") system, a call controller, a call manager, a media gateway controller, a video call server, an instant messaging server, a centralized server, or a distributed computing system.

3. The method of claim 1, wherein the first call comprises one of a session initiation protocol ("SIP")-based communication, a public switched telephone network ("PSTN") communication, or a plain old telephone service ("POTS") communication, wherein the SIP-based communication comprises at least one of a voice over Internet Protocol ("VoIP") call, an IP-based video call, or an instant message over IP.

4. The method of claim 1, wherein the suspected unsolicited or unwanted communication comprises at least one of a telemarketing communication, a robocall communication, or a communication instigating fraudulent activity.

5. The method of claim 1, wherein the suspected unsolicited or unwanted communication comprises a pre-recorded message.

6. The method of claim 1, wherein the portion of the call data of the first call comprises at least one of:

a first portion of the call data, the first portion of the call data being of a first predetermined duration;
a second portion of the call data overlapping with the first portion, without an initial portion that is of a second predetermined duration; or
a third portion of the call data after any of the first portion or the second portion, the third portion being of a third predetermined duration.

7. The method of claim 1, further comprising:
abstracting, using the computing system, raw data from the portion of the call data associated with the first call from the first originating party to produce the first abstracted raw data.

8. The method of claim 7, wherein abstracting the raw data to produce the first abstracted raw data comprises abstracting, using the computing system, raw data from the portion of the call data associated with the first call from the first originating party to produce the first abstracted raw data, without transcription of communication contained within the call data and without use of speech-to-text or text-to-speech functionality on the communication contained within the call data.

9. The method of claim 1, wherein comparing the first abstracted raw data with each of the plurality of abstracted raw data comprises determining, using the computing system, one or more similarities between the first abstracted raw data and each of the plurality of abstracted raw data, based at least in part on comparison of the at least one of word count data, phoneme count data, inter-word timing data, voice pitch estimation data, or background noise data associated with the first abstracted raw data with the at least one of word count data, phoneme count data, inter-word timing data, voice pitch estimation data, or background noise data associated with each of the plurality of abstracted raw data.

10. The method of claim 9, wherein comparing the first abstracted raw data with each of the plurality of abstracted raw data further comprises generating, using the computing system, a similarity score based on the determined one or more similarities between the first abstracted raw data and each of the plurality of abstracted raw data, wherein determining whether the first abstracted raw data is indicative of the first call being a suspected unsolicited or unwanted communication comprises determining that the generated similarity score is greater than a predetermined matching threshold value.

11. The method of claim 9, wherein determining the one or more similarities between the first abstracted raw data and each of the plurality of abstracted raw data comprises:
generating, using the computing system, a first score based on the first abstracted raw data;
comparing, using the computing system, the first score with each of the plurality of second scores each based on a corresponding one of the plurality of abstracted raw data; and
generating, using the computing system, a similarity score for each of the plurality of second scores based on the comparison of the first score with each of the plurality of second scores.

12. The method of claim 11, further comprising:
prior to comparing the first score with each of the plurality of second scores, pruning, using the computing system, the plurality of abstracted raw data to reduce a number of second scores among the plurality of second scores that require comparison, by filtering out abstracted raw data from the plurality of abstracted raw data based at least in part on a difference in one or more of the at least one of word count data, phoneme count data, inter-word timing data, voice pitch estimation data, or background noise data.

13. The method of claim 12, further comprising:
grouping, using the computing system, the plurality of abstracted raw data into one or more groups characterized by similarities in each of the at least one of word count data, phoneme count data, inter-word timing data, voice pitch estimation data, or background noise data;
wherein pruning the plurality of abstracted raw data to reduce the number of second scores among the plurality of second scores that require comparison comprises filtering out abstracted raw data from the plurality of abstracted raw data based at least in part on the one or more groups.

14. The method of claim 13, wherein grouping the plurality of abstracted raw data into one or more groups further comprises grouping the plurality of abstracted raw data into one or more groups based at least in part on at least one of one or more entities associated with previously determined sources of unsolicited or unwanted communications corresponding to abstracted raw data among the plurality of abstracted raw data, one or more groups of entities associated with previously determined sources of unsolicited or unwanted communications corresponding to abstracted raw data among the plurality of abstracted raw data, or one or more characteristics of unsolicited or unwanted communications corresponding to abstracted raw data among the plurality of abstracted raw data.

15. The method of claim 1, wherein the one or more tasks comprise at least one of:
blocking the first call;
responding to a call request that is associated with the first call with a busy signal;
sending a message to the first destination party indicating that the first call is a suspected unsolicited or unwanted communication;
updating a corpus of suspected robocalls to include the first abstracted raw data to the plurality of abstracted raw data; or
training rapid fraud determination.

16. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive a first call from an originating party intended for a first destination party;
compare first abstracted raw data, which is obtained from a portion of call data associated with the first call, with each of a plurality of abstracted raw data, which are obtained from portions of call data associated with a plurality of calls from a corresponding plurality of originating parties, the plurality of abstracted raw data and the first abstracted raw data each comprising at least one of word count data, phoneme count data, inter-word timing data, voice pitch estimation data, or background noise data;
determine whether the first abstracted raw data is indicative of the first call being a suspected unsolicited or unwanted communication, based at least in part on the comparison; and
based on a determination that the first abstracted raw data is not indicative of the first call being a suspected unsolicited or unwanted communication, connect the first call to the first destination party, and
based on a determination that the first abstracted raw data is indicative of the first call being a suspected unsolicited or unwanted communication, perform one or more tasks.

17. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive a first call from an originating party intended for a first destination party;
compare first abstracted raw data, which is obtained from a portion of call data associated with the first call, with each of a plurality of abstracted raw data, which are obtained from portions of call data associated with a plurality of calls from a corresponding plurality of originating parties, the plurality of abstracted raw data and the first abstracted raw data each comprising at least one of word count data, phoneme count data, inter-word timing data, voice pitch estimation data, or background noise data;
determine whether the first abstracted raw data is indicative of the first call being a suspected unsolicited or unwanted communication, based at least in part on the comparison; and
based on a determination that the first abstracted raw data is not indicative of the first call being a suspected unsolicited or unwanted communication, connect the first call to the first destination party, and
based on a determination that the first abstracted raw data is indicative of the first call being a suspected unsolicited or unwanted communication, perform one or more tasks.

18. The system of claim 17, wherein the computing system comprises at least one of one or more central processing units ("CPUs"), one or more graphics processing units ("GPUs"), one or more data processing units ("DPUs"), one or more tensor processing units ("TPUs"), a systolic array, a field-programmable gate array ("FPGA"), a correlation engine, a voice activity detection ("VAD") system, an application-specific integrated circuit ("ASIC") system, a call server, a call detail record ("CDR") system, a call controller, a call manager, a media gateway controller, a video call server, an instant messaging server, a centralized server, or a distributed computing system.

19. The system of claim 17, wherein the one or more tasks comprise at least one of:
blocking the first call;
responding to a call request that is associated with the first call with a busy signal;
sending a message to the first destination party indicating that the first call is a suspected unsolicited or unwanted communication;
updating a corpus of suspected robocalls to include the first abstracted raw data to the plurality of abstracted raw data; or
training rapid fraud determination.

* * * * *